(12) United States Patent
Nishiwaki et al.

(10) Patent No.: US 6,264,182 B1
(45) Date of Patent: Jul. 24, 2001

(54) MOTION CONVERTING DEVICE AND IMPACT ABSORBING/BUFFERING DEVICE

(75) Inventors: Shinji Nishiwaki, Gifu-ken (JP); Noboru Kikuchi, Ann Arbor, MI (US)

(73) Assignee: Kabushiki Kaisha Toyota Chuo Kenkyusho, Aishi-gun (JP)

( * ) Notice: Subject to any disclaimer, the term of this patent is extended or adjusted under 35 U.S.C. 154(b) by 0 days.

(21) Appl. No.: 09/265,362

(22) Filed: Mar. 10, 1999

(51) Int. Cl.$^7$ .................................................. F16F 7/00
(52) U.S. Cl. ...................... 267/141; 188/372; 188/373; 296/189
(58) Field of Search ................. 74/99 R, 105, 74/88, 89; 188/371, 372, 376, 377, 373; 267/136, 141, 154; 293/135, 136, 146, 147; 108/147.22, 103, 104; 296/189

(56) References Cited

U.S. PATENT DOCUMENTS

| | | | |
|---|---|---|---|
| 2,027,386 | * | 1/1936 | Krummer ............................ 74/99 R |
| 3,269,717 | * | 8/1966 | Beck .................................... 267/141 |
| 4,534,232 | * | 8/1985 | Stieg ................................... 74/99 R |

FOREIGN PATENT DOCUMENTS

| | | | |
|---|---|---|---|
| 57-1854 | * | 7/1982 | (JP) .................................... 74/99 R |
| 61-127015 | | 6/1986 | (JP) . |
| 7-46789 | | 2/1995 | (JP) . |

OTHER PUBLICATIONS

Nishiwaki et al., Structural Optimization Considering Flexibility, JSME International Journal, pp 476–484, 1998.*

* cited by examiner

*Primary Examiner*—Robert J. Oberleitner
*Assistant Examiner*—Thomas J. Williams
(74) *Attorney, Agent, or Firm*—Oblon, Spivak, McClelland, Maier & Neustadt, P.C.

(57) ABSTRACT

A motion converting device includes a plurality of branched elements. Each branched element includes a base beam, an intermediate beam, and a coupling beam. The base beam is elastically deformable, and one end of the base beam is fixed such that the base beam is slanted with respect to a base. The intermediate beam is also elastically deformable, and one end of the intermediate beam is fixed to the base beam at a position which is offset from a central portion of the base beam towards another end of the base beam. The coupling beam is likewise elastically deformable, and one end of the coupling beam is fixed to the same position as the intermediate beam. At each of the branched elements, the other end of the base beam is fixed to another end of an intermediate beam of another branched element, such that the plurality of branched elements is disposed in a loop-like arrangement.

12 Claims, 16 Drawing Sheets

DEVICE FORMED FROM
FOUR PORTION ELEMENTS

PORTION ELEMENT OF DEVICE

DEVICE FORMED FROM FOUR PORTION ELEMENTS

DEVICE EXAMPLE (1)

DEVICE EXAMPLE (2)

DEVICE EXAMPLE (3)

DEVICE EXAMPLE (4)

MECHANISM OF MOTION CONVERTING DEVICE

DETAILED CONFIGURATION

PROTOTYPE

FORMULATION OF FLEXIBILITY

DESIGN REQUIREMENTS

MICROSTRUCTURE

OPTIMIZATION FLOWCHART

FIG. 18A
FIG. 18B
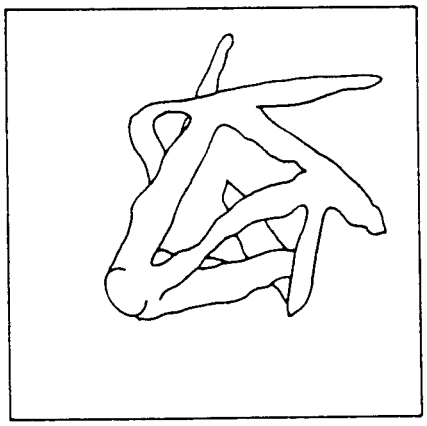
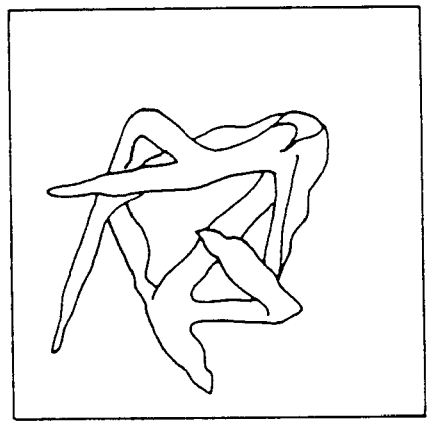
EXTRACTED DETAILED CONFIGURATIONS

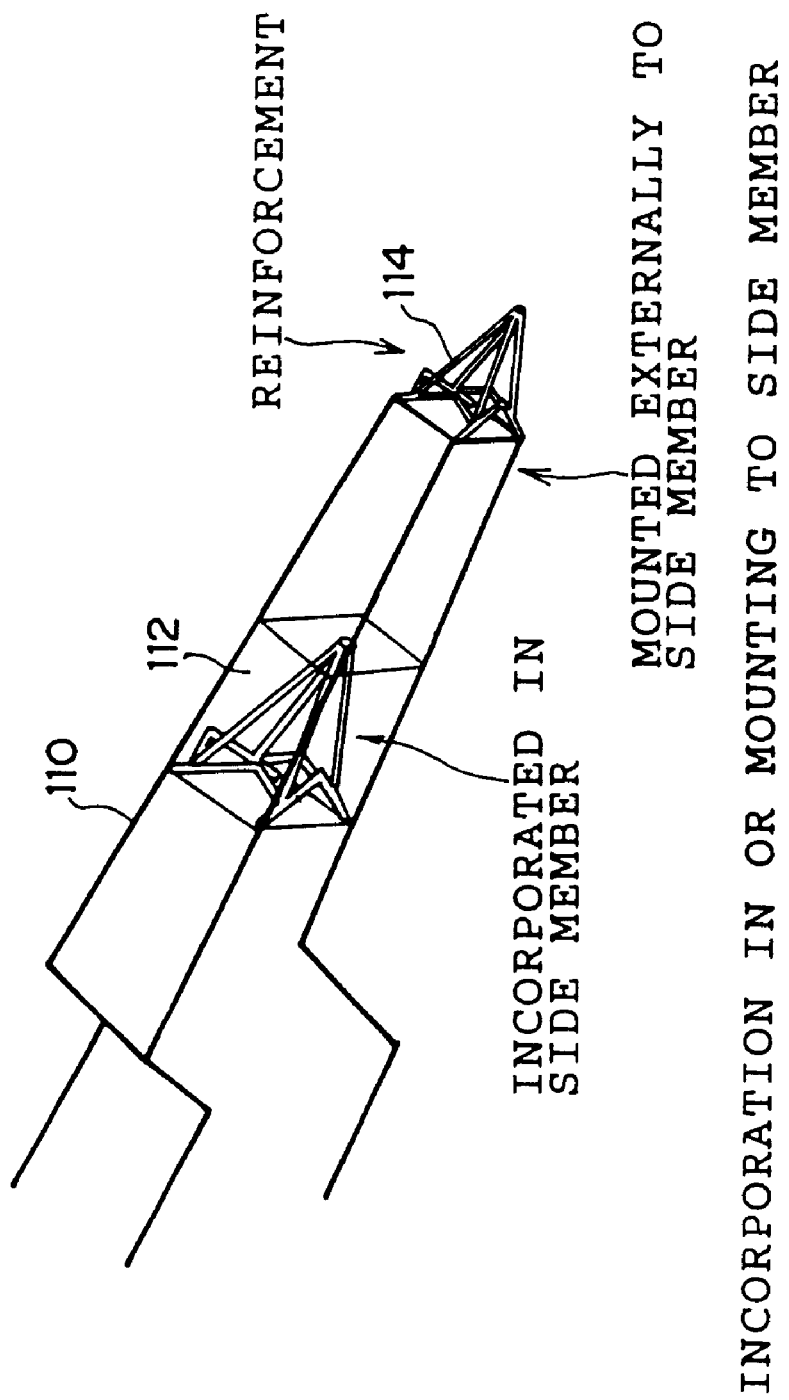

SIDE MEMBER BEAD PATTERN
(MOUNTED TO FOUR SURFACES)

SIDE MEMBER BEAD PATTERN
(MOUNTED TO TWO SURFACES)

MOTION CONVERTING DEVICE AND IMPACT ABSORBING/BUFFERING DEVICE

BACKGROUND OF THE INVENTION

1. Field of the Invention

The present invention relates to a motion converting device and an impact absorbing/buffering device, and in particular, to a motion converting device which converts one of linear motion and rotational motion to the other, and to an impact absorbing/buffering device which includes the motion converting device.

2. Description of the Related Art

Conventional examples of devices which convert rotational motion to linear motion are a robot actuator (Japanese Laid-Open Patent Application (JP-A) No. 61-127015) which includes a nut joined to a shape memory effect alloy wire and a screw rotary shaft (ball screw) engaged with the nut, and a linear actuator (Japanese Laid-Open Patent Application (JP-A) No. 7-46789) which uses a mechanism for converting rotational motion into linear motion by rotating a motor and winding up a flexible, tape-shaped sheet body.

However, in order to convert rotational motion to linear motion, the robot actuator uses the nut and the screw rotary shaft (ball screw), and has a sliding joint portion. Further, the linear actuator has a sliding surface between sheets, and further, cannot convert linear motion to rotational motion.

When a sliding portion is used, there arise problems such as noise, wear, backlash, and friction loss. Further, sliding portions require maintenance with lubricating oil. Therefore, sliding portions cannot be used in special environments such as in certain medical facilities in which oil and the like should be avoided for sanitary reasons, or in outer space where there is a low-gravity environment. Accordingly, the range of application is limited. Further, when motion is being converted, the nut, the screw rotary shaft and the like must be slid, and thus a load is not transmitted smoothly.

SUMMARY OF THE INVENTION

Accordingly, in view of the aforementioned problems, one object of the present invention is to provide a novel motion converting device which can convert one of linear motion and rotational motion to the other without a sliding portion, and to provide an impact absorbing/buffering device which includes the motion converting device.

In order to achieve the above object, a first aspect of the present invention is a motion converting device which converts between linear motion and rotational motion. The device has four branched elements, each comprising: a first beam which is elastically deformable, one end of the first beam being fixed to a base such that the first beam is slanted with respect to the base; a second beam which is elastically deformable, one end of the second beam being fixed to the first beam at a position which is offset from a central portion of the first beam towards the other end of the first beam; and a third beam which is elastically deformable, one end of the third beam being fixed to the position at which the one end of the second beam is fixed to the first beam. At each of the branched elements, the other end of the first beam is fixed to the other end of the second beam of another branched element such that the four branched elements are disposed in a loop-like arrangement. Respective other ends of the third beams of the respective branched elements are fixed together directly. The respective one ends of the first beams of the respective branched elements are fixed to the base so as to be symmetrical with respect to an axis of rotational motion. Thus, the plural branched elements are formed integrally and rotate as a whole.

Speaking summarily, each of the four branched elements includes a first beam, a second beam and a third beam. The first beam is elastically deformable, and one end thereof is fixed onto the base, such that the first beam is slanted with respect to the base. The second beam is elastically deformable, and one end thereof is fixed to a position of the first beam which is offset from the central portion of the first beam toward the other end of the first beam. The third beam is elastically deformable, and one end thereof is fixed to the position at which the one end of the second beam is fixed to the first beam.

For example, when the joined other ends of the third beams of the branched elements are moved linearly so as to move away relatively from the base, the third beams are moved so as to move away from the base. When the third beams move in this way, the first beams as well also attempt to move away from the base. However, the respective one ends of the first beams are fixed to the base. Thus, the respective first beams attempt to rotate around the respective fixed end. Further, at each of the branched elements, the other end of the first beam is fixed to the other end of the second beam of another branched element, such that the four branched elements are disposed in a loop-like arrangement. Therefore, the first beam of each branched element moves while being pulled by the second beam of another branched element. As a result, the respective other ends of the first beams of the branched elements rotate as a whole.

The one end of the third beam is fixed to the position at which the one end of the second beam is fixed to the first beam. The other end of the first beam of each branched element is fixed to the other end of a second beam of another one branched element. In this way, in place of sliding portions, the first beam, second beam and third beam elastically deform such that the motion is converted. Thus, one of linear motion and rotational motion can be converted into the other without any sliding portions.

A second aspect of the present invention is a motion converting device which converts between linear motion and rotational motion. The device has plural branched elements, each comprising: a first beam which is elastically deformable, one end of the first beam being fixed to a base such that the first beam is slanted with respect to the base; a second beam which is elastically deformable, one end of the second beam being fixed to the first beam at a position which is offset from a central portion of the first beam toward the other end of the first beam; and a third beam which is elastically deformable, one end of the third beam being fixed to the first beam at a position which is offset from a central portion of the first beam toward the other end of the first beam.

The principles of conversion of the second aspect from one of linear motion and rotational motion to the other are the same as those of the first aspect, and thus description thereof will be omitted. It is not absolutely necessary that the other ends of the third beams of the respective branched elements linearly move so as to move away relatively from the base and then the other ends of the first beams of the respective branched elements rotate as a whole. Instead, the other ends of the first beams of the respective branched elements may rotate as a whole and then the other ends of the third beams may linearly move so as to move away relatively from the base. The linear movement of the other ends of the third beams away from the base may occur in any of the following three forms: the other ends of the third beams move so as to move away from the base; the base moves so as to move away from the other ends of the third beams; and the base and the other ends move away from one another.

In the second aspect as well, the first beam, the second beam and the third beam are fixed, and the other end of the first beam of each of the branched elements is fixed to the other end of the second beam of another branched element. Thus, motion can be converted by the first beam, second beam and third beam elastically deforming, without any sliding portions. Therefore, one of linear motion and rotational motion can be converted to the other, even if there are no sliding portions.

In the second aspect, the respective other ends of the third beams of the plural branched elements may be fixed to an opposing base which opposes the above-mentioned base, or may be directly fixed to one another. Further, in the second aspect, for precise rotation, the respective one ends of the first beams of the plural branched elements may be fixed to the base so as to be symmetrical with respect to the axis of rotational motion. The one ends of the third beams of the plural branched elements may be fixed to the positions at which the one ends of the second beams are fixed to the first beams. At least two of the plural branched elements may be formed integrally as a whole.

The motion converting devices relating to the above aspects may be applied to various devices. For example, a third aspect of the present invention is an impact absorbing/buffering device in which the motion converting device is mounted to a side member of a vehicle. The impact absorbing/buffering device can absorb and buffer the impact (linear motion of the base and the other ends of the third beams approaching each other relatively) by converting the impact linear motion to rotational motion, as well as by bending and compressing the conventional side member. Thus, the device can absorb greater impact.

In this case, the motion converting device is mounted to at least one of the front side and the rear side of the side member. Further, a side member usually has a prism-shaped portion. On at least one pair of opposing surfaces of this prism-shaped portion, one branched structure or bead may be mounted on each of the surfaces such that the direction in which the base and the other end of the third beam are connected is the longitudinal direction of the side member. Further, plural branched elements may be mounted in plural stages such that the direction in which the base and the other ends of the third beams are connected is the longitudinal direction of the side member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 18A and 18B are diagrams illustrating a detailed structure extracted using the image-based design method.

FIG. 19 is a diagram illustrating an impact absorbing/buffering device including the motion converting device mounted to a side member of a vehicle.

DESCRIPTION OF THE PREFERRED EMBODIMENTS

Figure 1:
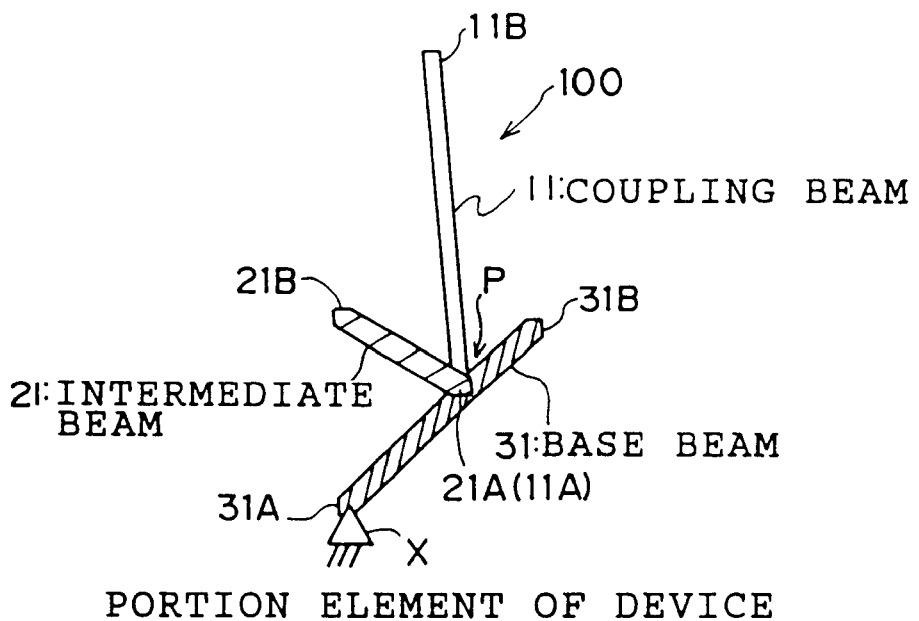
FIG. 1 is a diagram illustrating a branch portion element formed by three elastically deformable beams which are a coupling beam, an intermediate beam, and a base beam.
Figure 2:
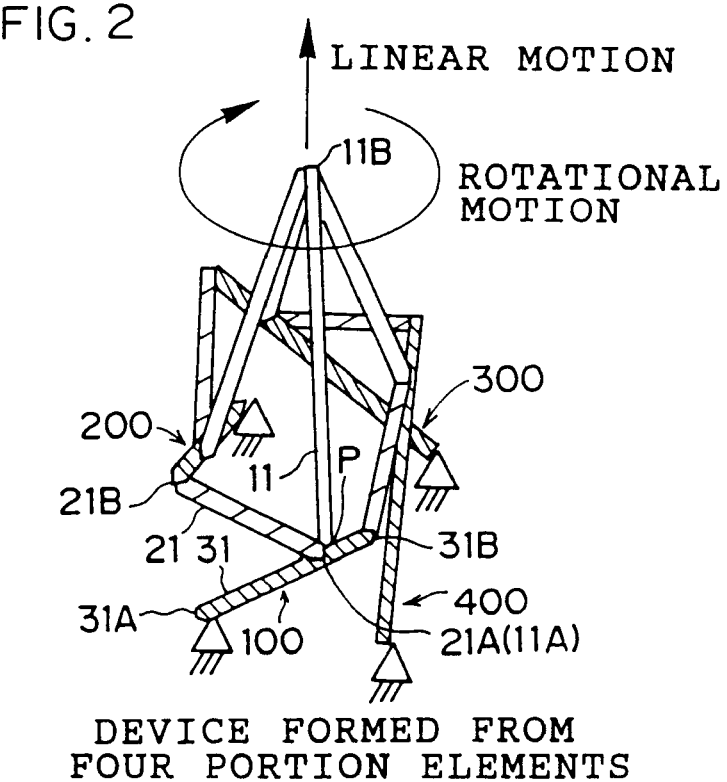
FIG. 2 is a diagram illustrating a device configured by joining four branched elements around an axis of rotational motion.

Referring now to the drawings, wherein like reference numerals designate identical or corresponding parts throughout the several views, and more particularly to FIG. 1 thereof, a motion converting device converts between linear motion and rotational motion. As shown in FIG. 2, the motion converting device is composed of a plurality of branched portion elements. A single branched portion element is illustrated in FIG. 1. Namely, the motion converting device includes four branched elements 100 through 400. Each of the four branched elements 100 through 400 includes a base beam 31 corresponding to the first beam of the present invention, an intermediate beam 21 corresponding to the second beam of the present invention, and a coupling beam 11 corresponding to the third beam of the present invention.

The base beam 31 is elastically deformable. One end 31A of the base beam 31 is fixed onto an unillustrated base such that the base beam 31 is slanted with respect to the base. In FIG. 1, X designates a point where the beam is fixed to the base. The intermediate beam 21 is also elastically deformable. One end 21A of the intermediate beam 21 is fixed at a position P of the base beam 31 which is offset from the central portion of the base beam 31 towards the other end 31B of the base beam 31. The coupling beam 11 likewise is elastically deformable. One end 11A of the coupling beam 11 is fixed at the position P at which the one end 21A of the intermediate beam 21 is fixed to the base beam 31.

The other end 31B of the base beam 31 of each of the branched elements 100 through 400 is directly fixed to the other end 21B of the intermediate beam 21 of another branched element such that the four branched elements 100 through 400 are configured in a loop-like arrangement.

Further, respective other ends 11B of the coupling beams 11 of the branched elements 100 through 400 are fixed together. For precise rotation, the one ends 31A of the base beams 31 of the plural branched elements 100 through 400 are fixed to the base symmetrically with respect to the axis of rotational motion. The plural branched elements 100 through 400 are as a whole formed integrally.

The motion converting device relating to the present invention is configured as described above, and utilizes elastic deformation to convert rotational direction motion into linear direction motion, or conversely, linear direction motion into rotational direction motion. Namely, the one end 11A of the coupling beam 11 is fixed at the position P at which the one end 21A of the intermediate beam 21 is fixed to the base beam 31, and the other end 31B of the base beam 31 of each of the branched elements 100 through 400 is fixed to the other end 21B of the intermediate beam 21 of another branched element. Thus, sliding portions such as joints are not required, since the base beam 31, the intermediate beam 21, and the coupling beam 11 elastically deform.

Figure 3:
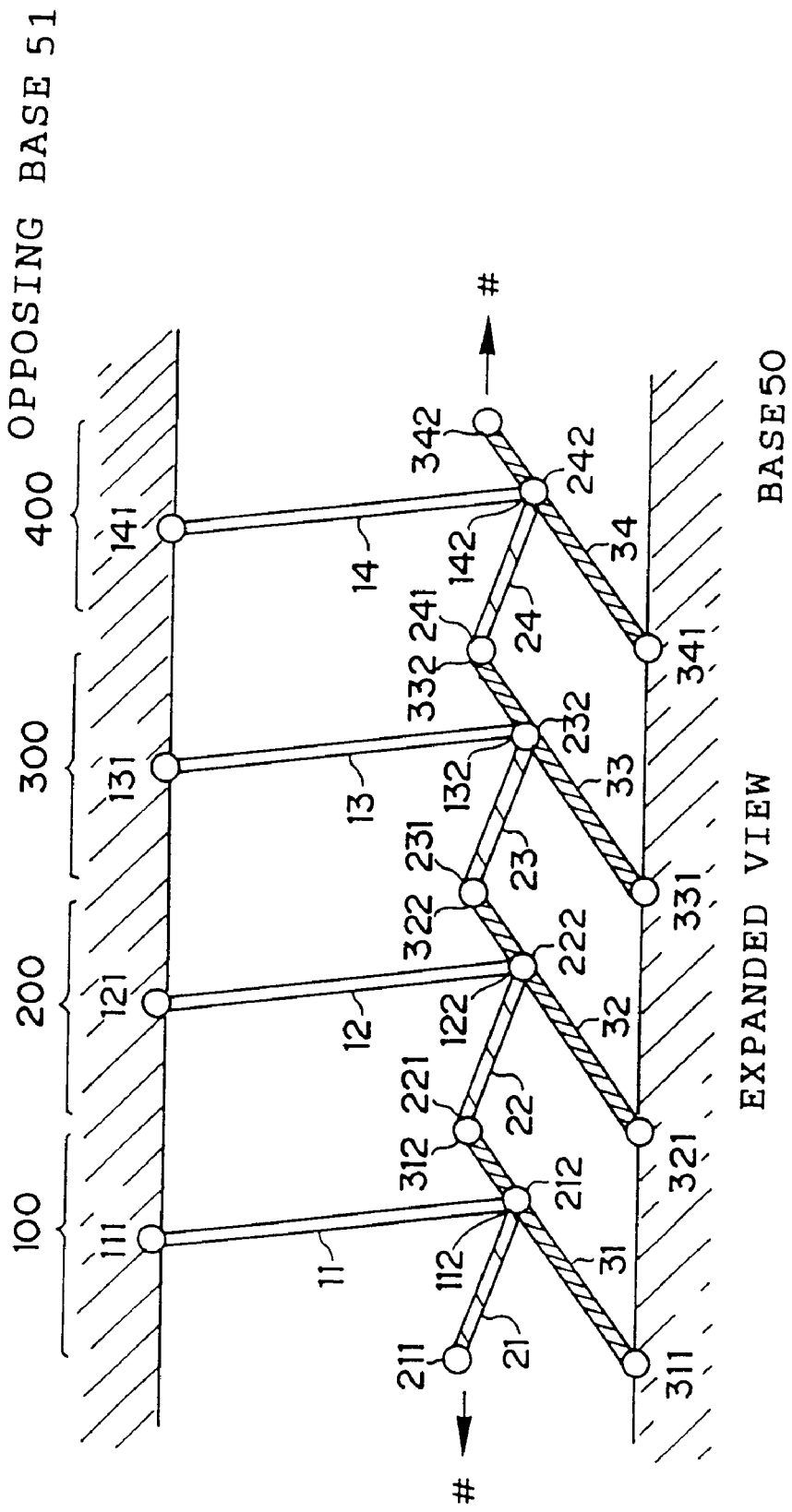
FIG. 3 is an expanded view illustrating the structure and movement of a motion converting device.

The mechanism of the above-described motion converting device will be discussed in detail hereinafter. As illustrated in FIG. 3, the motion converting device is configured by combining two or more branched elements 100 between a base 50 and an opposing base 51. Each branched element 100 is configured with three elastic beams which are the coupling beam 11, the intermediate beam 21, and the base beam 31. Hereinafter, the configuration of the motion converting device with four branched elements will be described.

The base beam 31 of the branched element 100 is disposed so as to be slanted with respect to the base 50. In other words, an end point 311 of the base beam 31 is fixed to the base 50 such that the base beam 31 is slanted at an angle which is greater than 0 degrees and less than 90 degrees. An end point 212 of the intermediate beam 21 is fixed to the base beam 31 at a position offset somewhat towards an end point 312 from the intermediate portion of the base beam 31. An end point 112 of the coupling beam 11 is fixed at a position somewhat towards the end point 312 of the intermediate portion of the base beam 31. In the present invention, the end point 112 of the coupling beam 11 is fixed at the same position as the end point 212 of the intermediate beam 21. However, the fixing is not limited to the same position, and the end point 112 may be fixed in a vicinity of the end point 212 of the intermediate beam 21. Another end point 111 of the coupling beam 11 is fixed to the other base 51 which opposes the base 50.

The basic configuration of branched element 200 is the same as that of the branched element 100. An end point 221 of an intermediate beam 22 is not fixed to a base beam 32, but instead is fixed to the end point 312 of the base beam 31 of the branched element 100. The end point 312 is not fixed to the base 50.

The basic structure of branched element 300 is the same as that of the branched element 100. An end point 231 of an intermediate beam 23 is not fixed to a base beam 33, but instead is fixed to an end point 322 of the base beam 32 of the branched element 200. The end point 322 is not fixed to the base 50.

The basic structure of branched element 400 is the same as that of the branched element 100. An end point 241 of an intermediate beam 24 is not fixed to a base beam 34, but instead is fixed to an end point 332 of the base beam 33 of the branched element 300. The end point 332 is not fixed to the base 50. An end point 342 of the base beam 34 also is not fixed to the base 50, but instead is fixed to an end point 211 of the intermediate beam 21 of the branched element 100. The end point 211 is not fixed to either the base beam 31 or the base 50.

Figure 4:
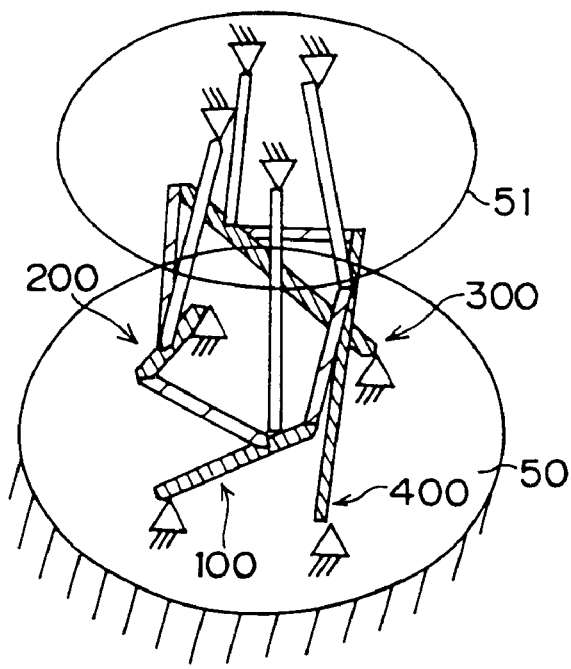
FIG. 4 is a diagram illustrating a first example of the motion converting device.

As one example of the motion converting device relating to the present invention, as illustrated in FIG. 4, the motion converting device has a basic structure in which the branched elements 100, 200, 300, 400 are located between the base 50 and the opposing base 51 symmetrically around the axis of rotational motion. The motion converting device may have a plurality of these basic structures connected in series, i.e., in stages.

Figure 5:
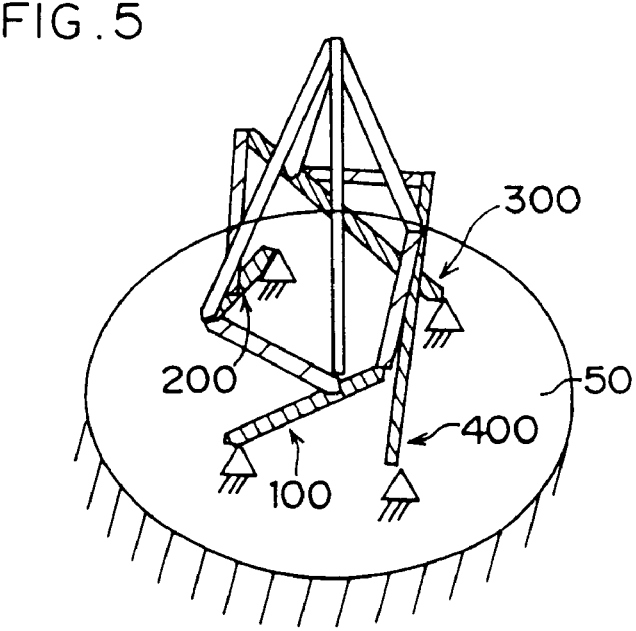
FIG. 5 is a diagram illustrating a second example of the motion converting device.

As illustrated in FIG. 5, another example of the motion converting device relating to the present invention is configured such that the opposing base 51 is eliminated, and the respective coupling beams 11 through 14 of the branched elements 100 through 400 are directly fixed together, i.e., are bundled together at an apex. The other portions are the same as those illustrated in FIG. 4.

Figure 6:
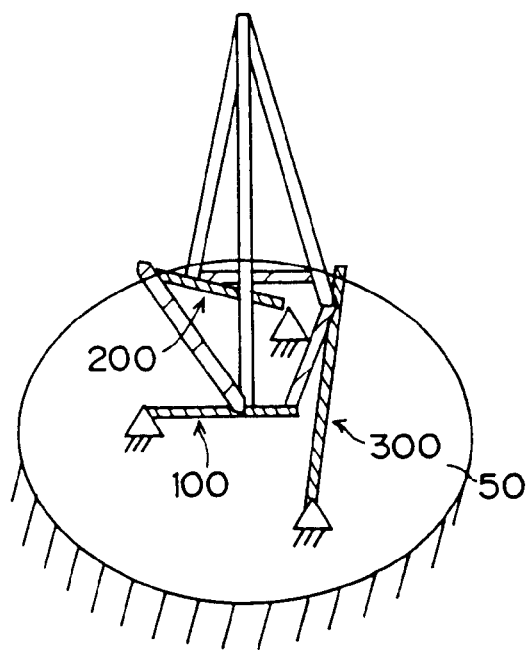
FIG. 6 is a diagram illustrating a third example of the motion converting device.
Figure 7:
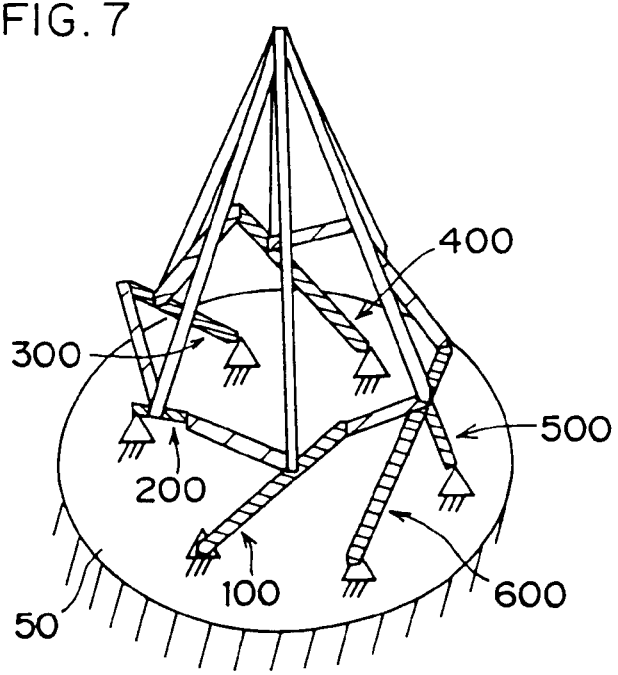
FIG. 7 is a diagram illustrating a fourth example of the motion converting device.

In the above-described examples, there are four branched elements. However, the present invention is not limited to the same, and a plural number of branched elements other than four may be used. For example, as illustrated in FIG. 6, three branched elements 100, 200, 300 may be used. Or, as shown in FIG. 7, six branched elements 100 through 600 may be used. This arrangement of course holds as well for the structure of FIG. 4 in which the coupling beams of the respective branched elements are not fixed together, i.e., the upper ends are not bundled together at an apex.

The other end of the base beam of each branched element may be fixed either directly or indirectly to the other end of the intermediate beam of another branched element, such that the plural branched elements are configured in a loop-like arrangement.

Figures 8A, 8B:
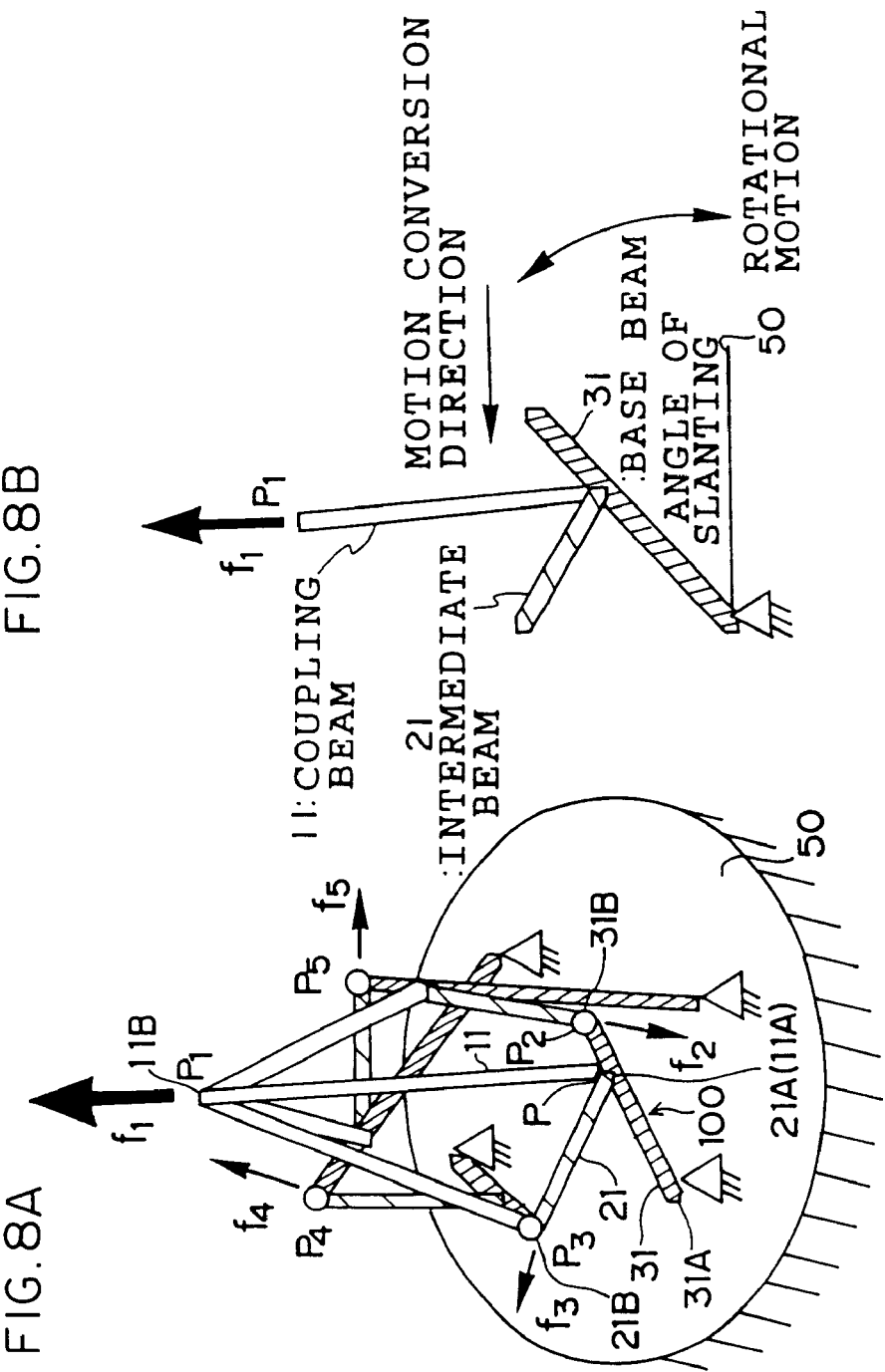
FIGS. 8A and 8B are diagrams for explaining the mechanisms of the motion converting device.

The principles of conversion from one of linear motion and rotational motion to the other by the motion converting device structured as described above will be discussed hereinafter with reference to the examples of the devices illustrated in FIGS. 8A and 8B.

When a load or displacement $f_1$ is applied in a linear direction to the upper ends $P_1$ of the coupling beams of the respective branched elements, the other ends $P_2$, $P_3$, $P_4$, $P_5$ of the base beams of the respective branched elements deform in directions $f_2$, $f_3$, $f_4$, $f_5$, respectively. As a result, twisting deformation occurs, and it causes rotational motion.

In other words, when the upper ends $P_1$ of the coupling beams of the respective branched elements are moved linearly so as to relatively move away from the base 50, the coupling beams also move away from the base 50. When the coupling beams move in this way, the base beams are also caused to move away from the base 50. However, because one end of each base beam is fixed to the base 50, the base beams are caused to rotate about these one ends. Further, the other ends $P_2$, $P_3$, $P_4$, $P_5$ of the base beams of the respective branched elements are each fixed to the other end of the intermediate beam of another branched element. Therefore, the base beam of a branched element moves while being pulled by the intermediate beam of another branched element. As a result, the other ends $P_2$, $P_3$, $P_4$, $P_5$ of the base beams of the respective branched elements rotate as a whole.

Conversely, when, due to twisting deformation or torque, a load or displacement acts on the other ends $P_2$, $P_3$, $P_4$, $P_5$ of the base beams of the respective branched elements in the directions $f_2$, $f_3$, $f_4$, $f_5$, respectively, the upper ends $P_1$ of the coupling beams of the respective branched elements deform in the linear direction $f_1$, i.e., linear motion occurs.

Due to the above mechanism, linear motion can be converted to rotational motion, or rotational motion can be converted to linear motion. The main reasons why such conversion of motion occurs are that the beams of the respective branched elements are elastically deformable, the base beams are slanted at an angle from greater than 0 degrees to less than 90 degrees, and the intermediate beams and the coupling beams are fixed to the base beams at positions which are somewhat further towards the top end sides than the intermediate positions of the base beams. Thus, when a load or displacement acts on the top ends $P_1$ of the coupling beams, the motion in the direction of displacement results in rotational motion of the base beams, as shown in the FIGS. 8A and 8B, due to the elastic deformation of the respective beams, and this rotational motion causes motion in the directions $f_2$, $f_3$, $f_4$, $f_5$ at the other ends $P_2$, $P_3$, $P_4$, $P_5$ of the base beams of the respective branched elements.

Figure 9:
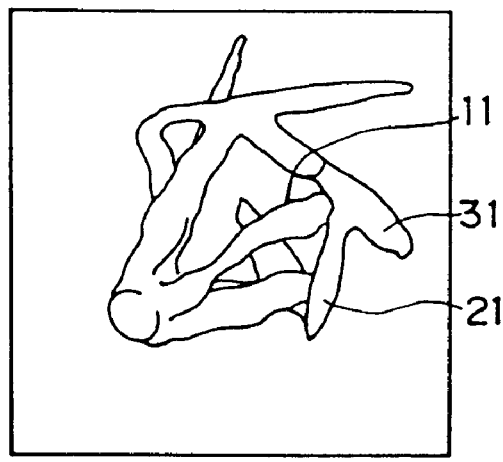
FIG. 9 is a diagram illustrating a detailed configuration of the motion converting device obtained by the topology optimization method and the image-based design method.
Figure 10:
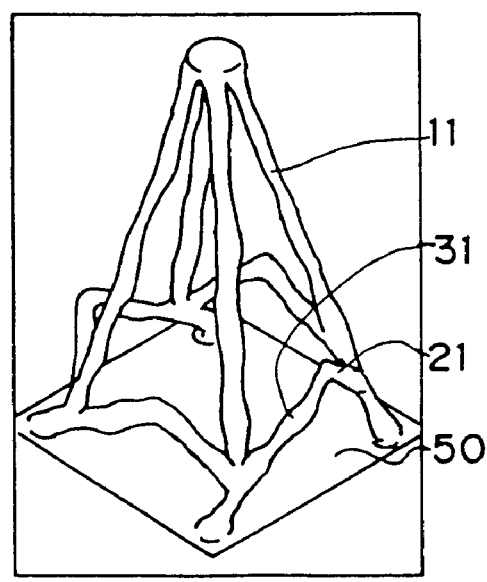
FIG. 10 is a diagram illustrating a prototype of the motion converting device.

FIG. 9 shows a detailed configuration of the present motion converting device developed by the methods which will be described hereinafter. These methods are the topology optimization method and the image-based design method. The conversion mechanism based on this elastic deformation is obtained by the following methods. The prototype which was constructed on the basis of the topology optimal configuration is shown in FIG. 10. In the example shown in FIG. 10, the entire motion converting device is designed integrally.

Next, the topological design optimization method based on a homogenization method will be described.

(1) Formulation of Flexibility

As described above, in order to define the structural flexibility for deforming in an indicated direction, the concept of the reciprocal theorem of energy, i.e., Betti's Theorem, is used. A summary thereof is as follows.

Figures 11A, 11B:
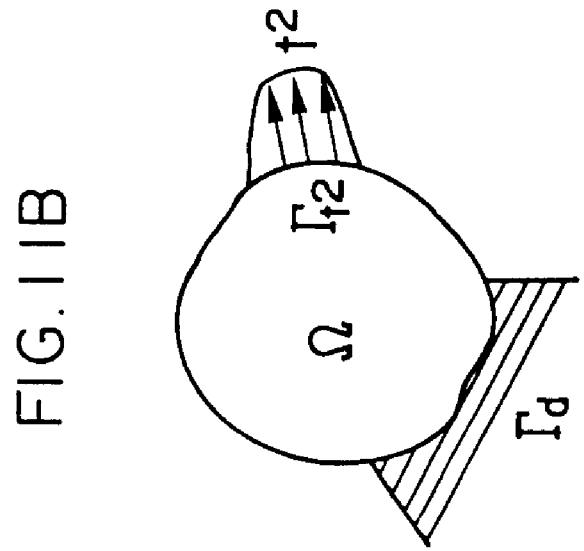
FIGS. 11A and 11B are views for explaining formulization of flexibility of the structural elements of the device.

As illustrated in FIGS. 11A and 11B, suppose that an elastic body $\Omega$ is completely fixed at boundary $\Gamma_d$. In the case illustrated in FIG. 11A, the elastic body is subjected to boundary traction $t^1$ (load) at boundary $\Gamma_t^{\,1}$ and the displacement field at this time is $u_1$. In the case illustrated in FIG. 11B, the elastic body is subjected to boundary traction $t^2$ at boundary $\Gamma_t^{\,2}$, and the displacement field at this time is $u_2$. It is assumed that traction $t^2$ is a unit vector there. The mutual mean compliance defined by formula (1) below is a measure of flexibility. Namely, as illustrated in FIG. 11A, in order to determine whether a specified position is displaced when traction $t^1$ is applied to boundary $\Gamma_t^{\,1}$, the following linear form is calculated:

$$L^2(u^1) = \int_{\Gamma_t^2} t^2 \cdot u^1 \, d\Gamma = \int_{\Gamma_t^2} t_i^2 u_i^1 \, d\Gamma$$

The maximization of $L^2$ ($u^1$) provides the structural flexibility at the boundary $\Gamma_t^{\,2}$ when the traction $t^1$ is applied.

On the other hand, in order to maximize stiffness, the mean compliance is minimized.

(2) Conditions for Designing Mechanism Using Flexibility

Figure 12A:
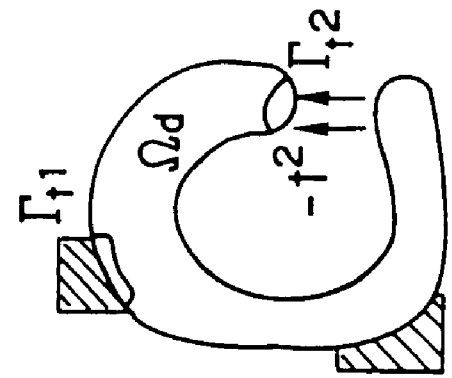
FIGS. 12A through 12C are diagrams for explaining three requirements for designing mechanism implementing flexibility.
Figure 12B:
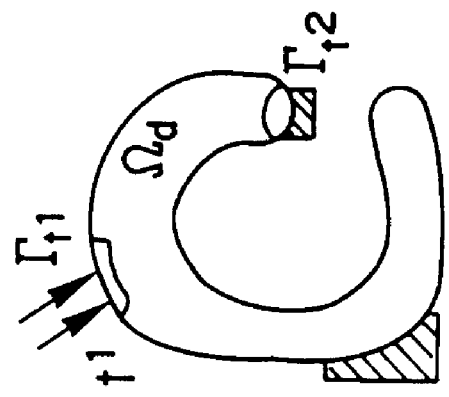
Figure 12C:
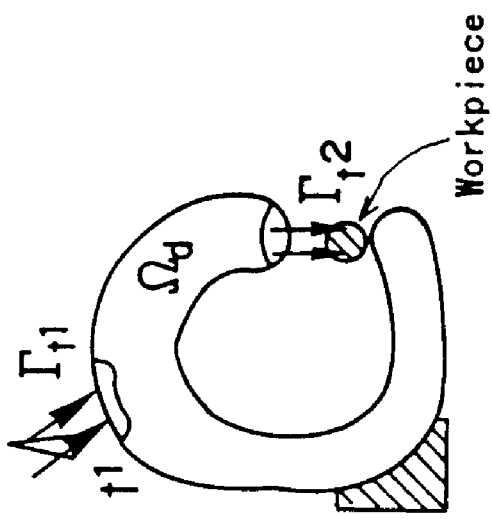

As illustrated in FIGS. 12A through 12C, three requirements must be taken into consideration in order to design a mechanism using flexibility. First, as illustrated in FIG. 12A, when traction $t^1$ is applied to a boundary $\Gamma_t^{\,1}$ of a flexible structure, the boundary $\Gamma_t^{\,2}$ must deform in the direction of traction $t^2$. This is the flexibility requirement. Second, as illustrated in FIG. 12B, the boundary $\Gamma_t^{\,1}$ must have sufficient stiffness in order to resist the traction $t^1$. This is the stiffness requirement. Third, as illustrated in FIG. 12C, the boundary $\Gamma_t^{\,2}$ must have sufficient stiffness in order to resist traction $-t^2$. This is another stiffness requirement. In order to obtain the optimal design configuration satisfying the above three requirements, a multi-objective function is newly constructed and an optimal design configuration is obtained using topology optimization. Refer to Nishiwaki, S., Min, S., Ejima, S., and Kikuchi, N., "Structural Optimization Considering Flexibility (Integrated Design Method for Compliant Mechanism)", JSME International Journal, Series C, Vol. 41, No. 3 (1998), pp. 476–484.

(3) Topological Design Optimization Method Using a Homogenization Method

The topological design optimization method using a homogenization method is based on the concept of a fixed and extended design domain and the introduction of a $X_\Omega$ function expressed by formula (2) below. Refer to Bendsøe, M. P. and Kikuchi, N., "Generating Optimal Topologies in Structural Design Using a Homogenization Method", Comput. Methods. Appl. Mech. Eng., Vol. 71 (1988), pp. 197–224.

$$X_\Omega(x) = \begin{cases} 1 & \text{if } x \in \Omega_d \\ 0 & \text{if } x \in D \setminus \Omega_d \end{cases}$$

In formula (2), x represents a position, $\Omega_d$ is a original design domain, specifically, a design domain of the present motion converting device, and D is the fixed and extended design domain which includes the original design domain $\Omega_d$. Formula (2) expresses the relationship between the fixed and extended design domain D and the original design domain $\Omega_d$. When the position x is within the original design domain $\Omega_d$, i.e., when a distribution of the material within D is desired, $X_\Omega$ is set to 1. When the position x is not within the original design domain $\Omega_d$, i.e., when the material is not to be distributed within D, $X_\Omega$ is set to 0.

Figure 13:
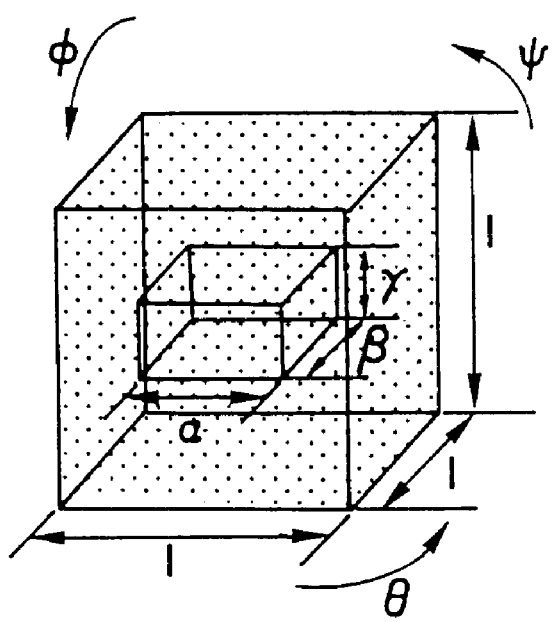
FIG. 13 is a diagram illustrating a microstructure.

Using this $X_\Omega$ function, a design optimization problem is replaced with a material distribution problem. Namely, if the material is distributed on the basis of $X_\Omega=0$ or $X_\Omega=1$, the material is distributed to an appropriate place within the fixed and extended design domain D. Thus, the objective configuration, i.e., a detailed configuration of the present motion converting device, is obtained. However, since this $X_\Omega$ function is not differentiable everywhere, it is difficult to deal with this function in a numerical manner. To overcome this problem, the $X_\Omega$ function is approximated as a continuous function in a global sense, using the homogenization method. Homogenized physical values are numerically computed, and optimization is achieved using these values. In order to compute the homogenized physical values, a microstructure must be defined. Ideally, the microstructure should be an infinitely small domain. Here, for example, the rectangular box illustrated in FIG. 13 is used. Refer to Suzuki, K. and Kikuchi, N., "A Homogenization Method for Shape and Topology by Optimization", Comput. Methods. Appl. Mech. Eng., Vol. 93 (1991), pp. 291–318. As illustrated in FIG. 13, the microstructure is formed inside an empty rectangular box in a unit cell, where ($\alpha$, $\beta$, $\gamma$, $\phi$, $\psi$, and $\theta$ are regarded as the design variables. The variables $\phi$, $\psi$, and $\theta$ represent the three dimensional rotations of the unit cell.

In order to develop a complete void which implies $X_\Omega=0$, $\alpha$, $\beta$ and $\gamma$ must be 1, whereas for a solid material which implies $X_\Omega=1$, $\alpha$, $\beta$ and $\gamma$ must be 0. Furthermore, in order to develop a composite status which implies an intermediate value of $X_\Omega$, these design variables in this microstructure must be greater than 0 and less than 1. In this way, the $X_\Omega$ function is replaced by a continuous function.

Next, the optimization process will be described hereinafter with reference to FIG. 14. Before this optimization process is executed, an original design domain $\Omega_d$, such as that illustrated in FIG. 15, is set in advance within the fixed and extended design domain D. Then, the optimization process is executed. In the original design domain of FIG. 15, there are set an advancing direction $f_1$, a position $P_1$ on which advancing motion acts, points $P_2, P_3, P_4, P_5$ which are rotated, and twisting directions $f_2, f_3, f_4, f_5$ of the points $P_2, P_3, P_4, P_5$.

Figure 14:
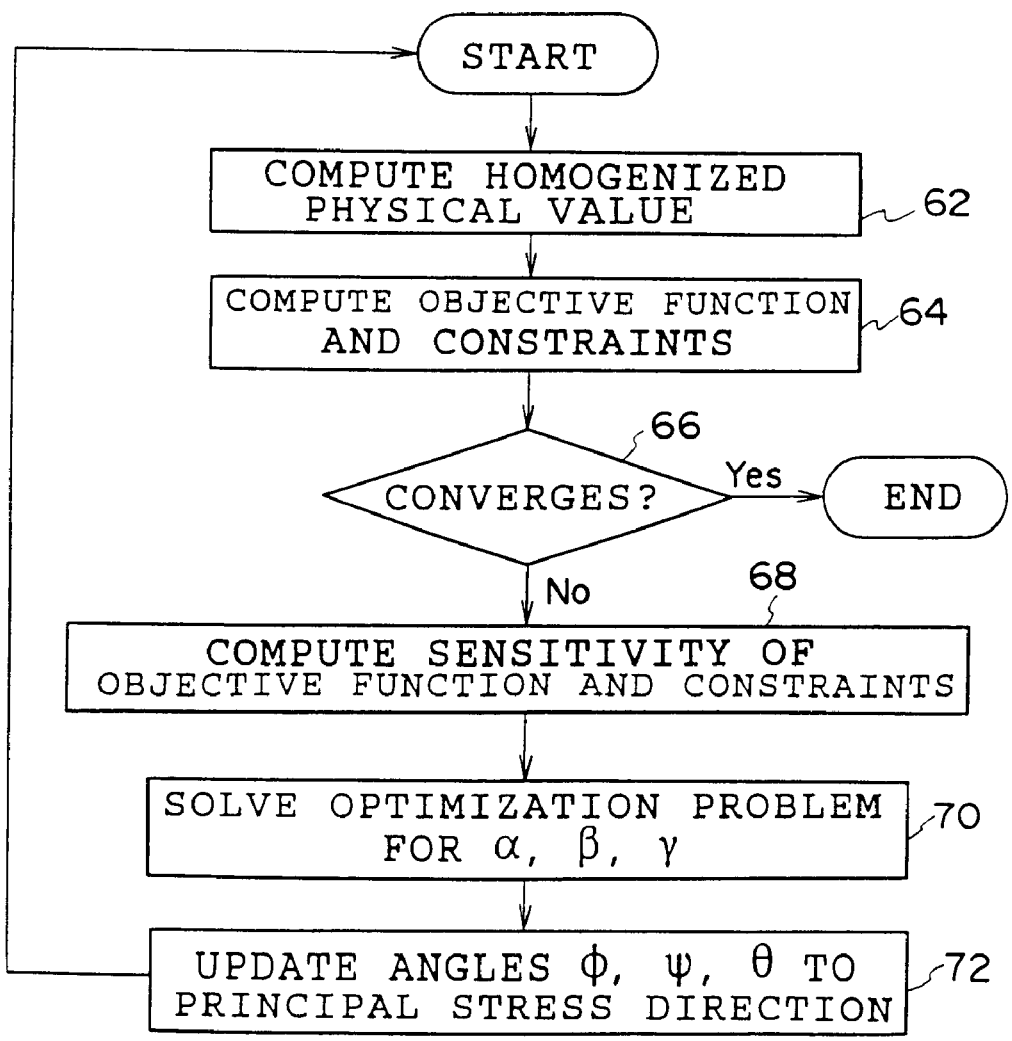
FIG. 14 is a flowchart illustrating an optimization process for obtaining an optimal design configuration.
Figure 15:
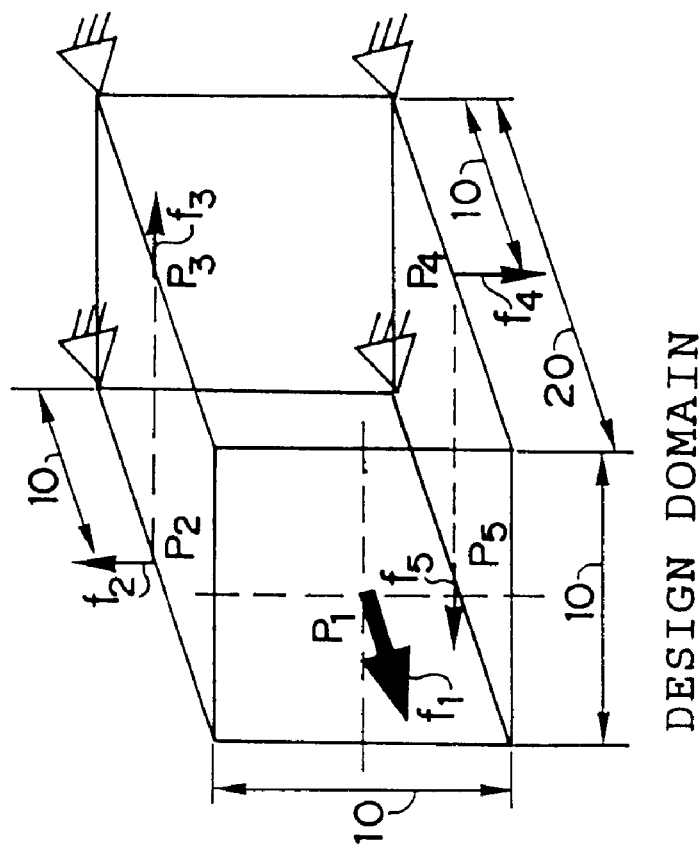
FIG. 15 is a diagram illustrating a disign domain at the time of designing a mechanism which utilizes flexibility.
Figure 16A:
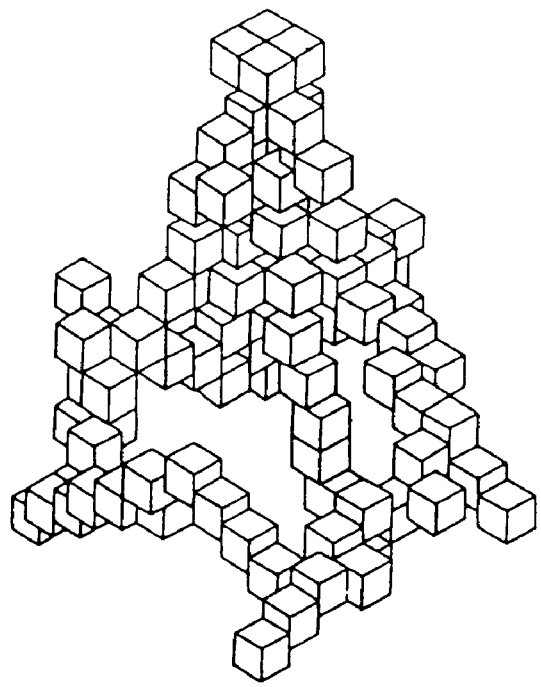
FIGS. 16A and 16B are diagrams illustrating an optimal design configuration obtained by the optimization process of FIG. 14.
Figure 16B:
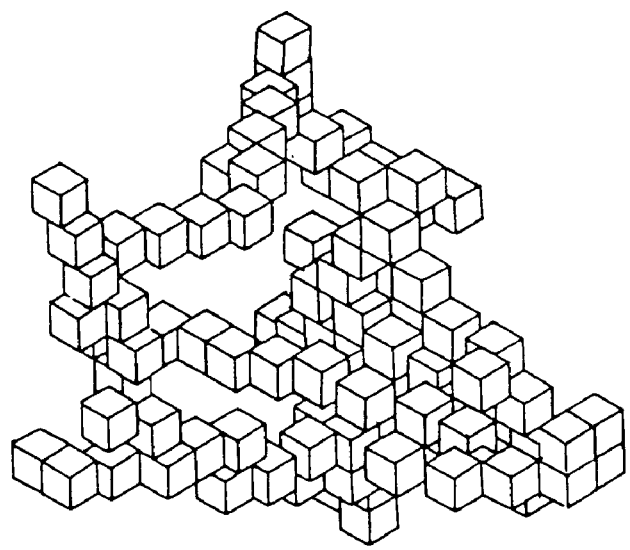
Figure 17A:
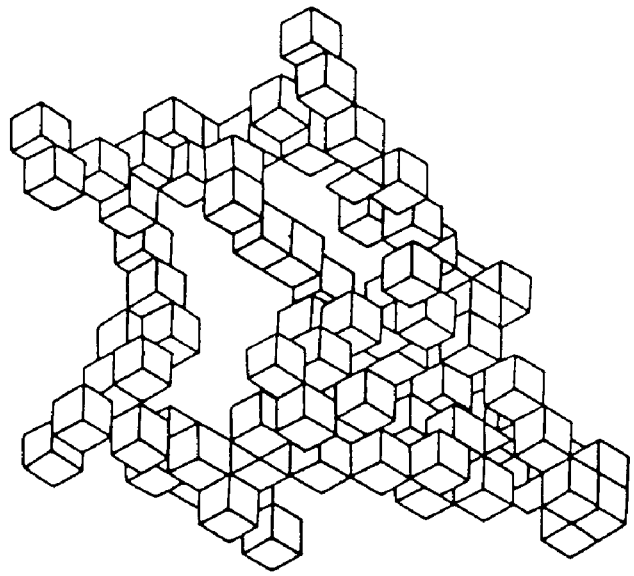
FIGS. 17A and 17B are diagrams illustrating an optimal design configuration obtained by the optimization process of FIG. 14.
Figure 17B:
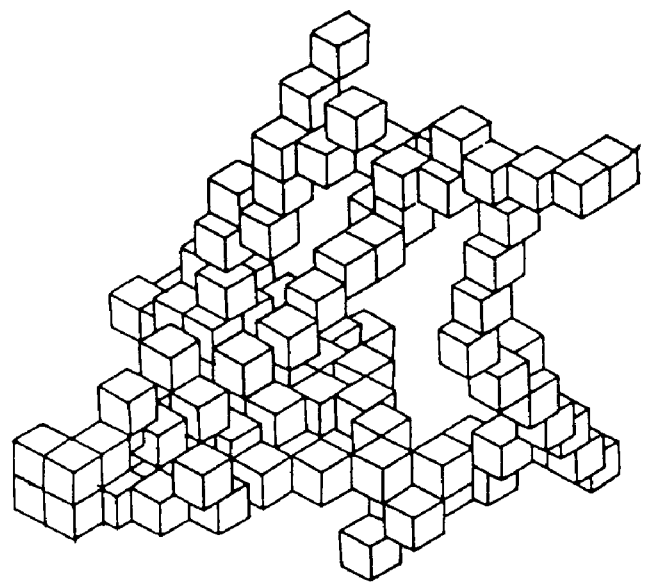

In step 62 of FIG. 14, homogenized physical values are computed. Namely, as described above, using the homogenization method, the $X_\Omega$ function is replaced with a continuous function, and the material distribution problem is solved.

In step 64, an objective function and constraints are computed. Namely, the values of the parameters of each microstructure, which is within the preset fixed and extended design domain and which satisfies the above-described three requirements shown in FIGS. 12A through 12C, are computed. In this way, the structure of each microstructure is made.

In step 66, by determining whether the objective function and the constraints computed from the parameters of the respective microstructures are prescribed values, it is determined whether the objective function and the constraints converge. If the objective function and the constraints do not converge, in step 68, the sensitivity, which indicates the directions in which the respective parameters are to be changed, of the objective function and the constraints is computed.

In step 70, on the basis of the sensitivity of the objective function and the constraints, the optimization problem is solved, i.e., redesigned, for the lengths $\alpha$, $\beta$, $\gamma$ of the respective microstructures.

In step 72, the angles $\phi$, $\psi$, $\theta$ are updated in the principal stress direction. The routine then returns to step 62, and the steps 62 and 64 are again executed. In this way, if the objective function and the constraints converge, the optimal design configuration of the parameters of the respective microstructures can be obtained. Thus, the present process is completed. As a result of the above-described process, an optimal design configuration is obtained as illustrated in FIGS. 16A, 16B, 17A, 17B. These four figures show the optimal design configuration as seen from four different directions.

The optimal design configuration shown in FIGS. 16A, 16B, 17A, 17B is structured by block configurations corresponding to the respective microstructures. The topology optimal configuration is sometimes hard to interpret as a real structure because of the complex and ambiguous material distribution in the extended design domain.

Several methods have been proposed to overcome this problem. However, since these methods use conventional interpolation functions such as a spline function, the extracted configuration is very different from a configuration which is expected, if we deal with complex topology optimal configurations. Therefore, the image-based design method which was first proposed by Kikuchi et al. is used.

In this method, the density distribution of the topology optimal configuration is represented with a real number between 0 to 255 of gray scale values. The gray scale values are interpolated using the moving least square method introduced by Belytschko et al. Then, the digital image of the real structure is obtained using an appropriate threshold. If the gray scale value is larger than the threshold in a pixel or voxel, this pixel or voxel lies inside a real structure. Conversely, if the gray scale value is smaller than the threshold in the pixel or voxel, this pixel or voxel lies outside a real structure.

The image-based approach is attractive since this method can integrate the topology optimization, image processing, construction of the detailed structure model, verification of the performance, and construction of the prototype into a consistent design system. On the basis of these results, the prototype illustrated in FIG. 10 was produced.

As described above, the motion converting device relating to the present invention does not include any joints, i.e., sliding portions, as do conventional mechanisms, and thus, has the advantage that there is no need for lubricant, i.e., the motion converting device is maintenance-free.

Furthermore, because the motion converting device does not have joints, i.e., sliding portions, which are required by conventional mechanisms, there are none of the problems which arise with conventional devices such as noise, wear, backlash, or friction loss.

Moreover, in the motion converting device relating to the present invention, elastic deformation is utilized, i.e., there are no sliding portions. Thus, when motion is converted from rotational direction motion to linear direction motion, or from linear direction motion to rotational direction motion, the load is transmitted smoothly.

Using a function which converts linear motion to rotational motion, the above-described motion converting device can be used as an impact absorbing/buffering device which aims for impact stability of the body structure of a vehicle. For example, as illustrated in FIG. 19, the motion converting device, in which the respective beams are made of steel, is incorporated inside a side member 112 or is attached as a reinforcement 114 outside of a side member 110 of a vehicle or at least is affixed to one of the front side and the rear side of the side member 112. In a conventional impact absorbing/buffering device, energy is absorbed by the effects of bending and compressing. However, in an impact absorbing/buffering device utilizing the present motion converting device, a twisting mode can be newly added. As a result, the amount of absorbed energy can be increased.

Figure 20:
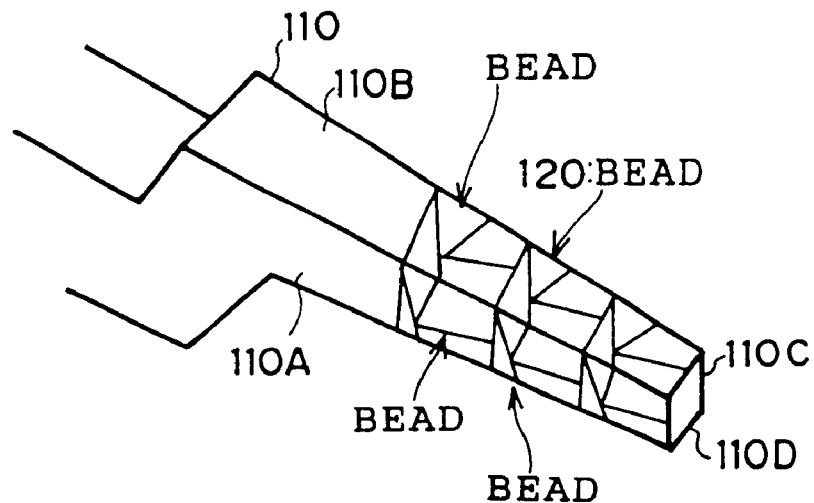
FIG. 20 is a diagram illustrating a modified example of the impact absorbing/buffering device.
Figure 21:
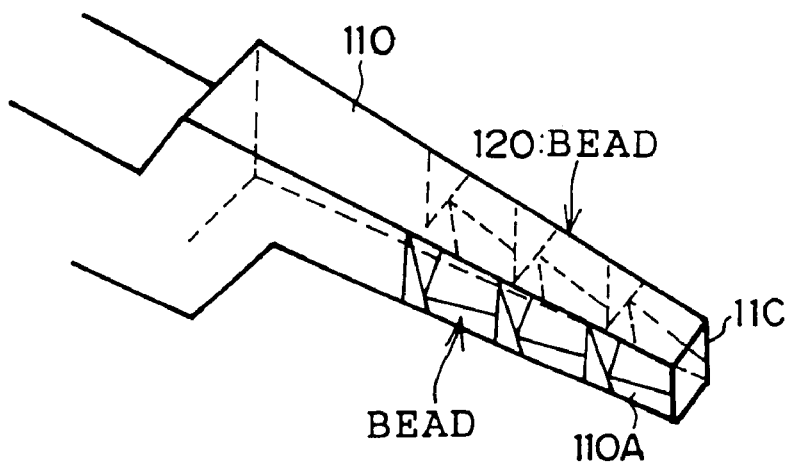
FIG. 21 is a diagram illustrating another modified example of the impact absorbing/buffering device.

FIG. 20 illustrates a modified example of an impact absorbing/buffering device to which the present motion converting device is applied. As illustrated in FIG. 20, a bead 120, which has the configuration of the present motion converting device, is attached to each of four surfaces 110A through 110D of a rectangular prism-shaped portion of the side member 110. In this way, a twisting mode can be added to the collapsing mode at the time of a collision. Even if the beads 120 are disposed only at two opposing surfaces 110A and 110C of the rectangular prism-shaped portion of the side member 110 as shown in FIG. 21, it is possible to add a twisting mode which approximately causes rotational motion. Thus, the effect of increasing the amount of absorbed energy can be obtained. In this case, the intermediate beams of the branched elements disposed at one of the surfaces and the base beams of the branched elements disposed at the opposing surface are indirectly fixed via the surface of the side member 110 disposed between the two opposing surfaces.

In the examples described above, the motion converting device of the present invention is mounted to the side member of a vehicle so as to form an impact absorbing/buffering device. However, the present invention is not limited to the same. Namely, as described above, because there is no need for maintenance, there is no need to use lubricating oil. Thus, the motion converting device may be applied to apparatuses used in special environments such as medical instruments, in which oil and the like should be avoided for sanitary reasons, or in outer space where there are low-gravity environments.

Various other concrete examples can be envisaged. For example, if the optimization program is executed under different conditions, a different configuration can easily be designed.

Obviously, numerous other modifications of the present invention are possible in light of the above teachings. It is therefore to be understood that, within the scope of the appended claims, the invention may be practiced otherwise than as specifically described herein.

What is claimed as new and desired to be secured by letters patent of the United States is:

1. A motion converting device which converts between linear motion and rotational motion, said device having a plurality of branched elements, each of the branched elements comprising:
   a first beam which is elastically deformable, one end of the first beam being fixed to a base such that the first beam is slanted with respect to the base;
   a second beam which is elastically deformable, one end of the second beam being fixed to the first beam at a position which is offset from a central portion of the first beam towards the other end of the first beam; and
   a third beam which is elastically deformable, one end of the third beam being fixed to the position at which the one end of the second beam is fixed to the first beam;
      wherein, at each of the branched elements, the other end of the first beam is fixed to the other end of the second beam of another branched element such that the plurality of branched elements is disposed in a loop-like arrangement,
      wherein other ends of the third beams of the respective branched elements are fixed together directly,
      wherein one end of the first beams of the respective branched elements are fixed to the base so as to be symmetrical with respect to an axis of rotational motion, and
      wherein the plurality of branched elements is formed integrally as a whole.

2. A motion converting device which converts between linear motion and rotational motion, said device having plural branched elements, each of the plural branched elements comprising:
   a first beam which is elastically deformable, one end of the first beam being fixed to a first base such that the first beam is slanted with respect to the first base;
   a second beam which is elastically deformable, one end of the second beam being fixed to the first beam at a position which is offset from a central portion of the first beam towards the other end of the first beam; and
   a third beam which is elastically deformable, one end of the third beam being fixed to the first beam at a position which is offset from a central portion of the first beam towards the other end of the first beam;
      wherein, at each of the branched elements, the other end of the first beam is fixed to the other end of the second beam of another branched element such that the plural branched elements are disposed in a loop-like arrangement.

3. A motion converting device according to claim 2, wherein respective other ends of the third beams of the plural branched elements are fixed to an opposing base which opposes the first base.

4. A motion converting device according to claim 2, wherein respective other ends of the third beams of the plural branched elements are directly fixed together.

5. A motion converting device according to claim 2, wherein the respective one ends of the first beams of the plural branched elements are fixed to the first base in an annular arrangement so as to be symmetrical with respect to an axis of rotational motion.

6. A motion converting device according to claim 2, wherein the respective one ends of the third beams of the plural branched elements are fixed to the positions at which the respective one ends of the second beams are fixed to the first beams.

7. A motion converting device according to claim 2, wherein at least two of the plural branched elements are formed integrally.

8. A motion converting device according to claim 2, wherein the plural branched elements are formed integrally as a whole.

9. A motion converting device which converts between linear motion and rotational motion, said device having plural branched elements, each of the plural branched elements comprising:
   a first beam which is elastically deformable, one end of the first beam being fixed to a first base such that the first beam is slanted with respect to the first base;
   a second beam which is elastically deformable, one end of the second beam being fixed to the first beam at a position which is offset from a central portion of the first beam towards the other end of the first beam; and
   a third beam which is elastically deformable, one end of the third beam being fixed to the first beam at a position which is offset from a central portion of the first beam towards the other end of the first beam;
      wherein, at each of the branched elements, the other end of the first beam is fixed to the other end of the second beam of another branched element such that the branched elements are disposed in a loop-like arrangement;
      wherein said device is mounted as an impact absorbing/buffering device to a side member of a vehicle.

10. A motion converting device according to claim 9, wherein said impact absorbing/buffering device is mounted to at least one of a front side and a rear side of the side member.

11. A motion converting device according to claim 9, wherein the side member has a prism-shaped portion, and wherein one of the branched elements is mounted to each surface of at least one pair of opposing surfaces of the prism-shaped portion, such that a direction in which the first base and the other ends of the third beams are connected is a longitudinal direction of the side member.

12. A motion converting device according to claim 9, wherein the plural branched elements are mounted in stages such that a direction in which the first base and the respective other ends of the third beams are connected is a longitudinal direction of the side member.

* * * * *

UNITED STATES PATENT AND TRADEMARK OFFICE
CERTIFICATE OF CORRECTION

PATENT NO. : 6,264,182 B1 Page 1 of 1
DATED : July 24, 2001
INVENTOR(S) : Nishiwaki et al.

It is certified that error appears in the above-identified patent and that said Letters Patent is hereby corrected as shown below:

<u>Title page,</u>
Item [73], Assignee's address should read:

-- [73] Assignee: Kabushiki Kaisha Toyota Chuo Kenkyusho, Aichi-gun (JP) --

Signed and Sealed this

Twenty-second Day of January, 2002

Attest:

Attesting Officer

JAMES E. ROGAN
*Director of the United States Patent and Trademark Office*